US009015807B2

(12) United States Patent
Howard et al.

(10) Patent No.: US 9,015,807 B2
(45) Date of Patent: Apr. 21, 2015

(54) AUTHORIZING APPLICATION ACCESS TO SECURE RESOURCES

(75) Inventors: Robert McKee Howard, Seattle, WA (US); Titus Constantin Miron, Seattle, WA (US); William David Taylor, Redmond, WA (US); Shaofeng Zhu, Bellevue, WA (US); Eray Aydin, Kirkland, WA (US); Venkatesh Veeraraghavan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/308,572

(22) Filed: Dec. 1, 2011

(65) Prior Publication Data
US 2013/0145427 A1     Jun. 6, 2013

(51) Int. Cl.
*H04L 29/06* (2006.01)
*G06F 21/62* (2013.01)

(52) U.S. Cl.
CPC ........ *G06F 21/62* (2013.01); *G06F 2221/2141* (2013.01)

(58) Field of Classification Search
CPC ............ G06F 21/62; G06F 2221/2141; G06F 21/629; G06F 2221/2113; G06F 12/1458; G06F 12/1491; G06F 21/44; H04L 63/08; H04L 63/0428; H04L 63/102; H04L 63/20; H04W 12/08
USPC ............................................................. 726/4
See application file for complete search history.

(56) References Cited

U.S. PATENT DOCUMENTS

| 7,257,815 | B2 | 8/2007 | Gbadegesin et al. |
| 7,502,794 | B2 | 3/2009 | Pelz et al. |
| 7,650,644 | B2 | 1/2010 | Cheng et al. |
| 7,885,900 | B1 | 2/2011 | Bender |
| 2003/0233544 | A1* | 12/2003 | Erlingsson .................... 713/167 |
| 2004/0010682 | A1 | 1/2004 | Foster et al. |

(Continued)

FOREIGN PATENT DOCUMENTS

CN            101794366 A      8/2010

OTHER PUBLICATIONS

Tang, et al., "Security Control System with SAS Application Dispatcher", Retrieved at <<http://www2.sas.com/proceedings/sugi28/231-28.pdf>>, SAS Users Group International, Feb. 30-Apr. 3, 2003, Paper 231-28, pp. 1-3.

(Continued)

*Primary Examiner* — Ali Abyaneh
(74) *Attorney, Agent, or Firm* — Tom Wong; Jim Ross; Micky Minhas

(57) ABSTRACT

An application submits a permission request to a resource server. In response to receiving the request, the resource server generates a user interface that asks the user to grant or deny the requested permissions. If the permissions are granted, data is stored indicating that the application has the requested permissions. When a runtime request for a resource is received, the resource server determines whether the request has been made by a user, by an application, or by an application on behalf of a user. If the request is made by an application only, the request is granted only if the application has permission to access the resource by way of a direct call not on behalf of a user. If the request is made by an application on behalf of a user, the request is granted only if both the user and the application have sufficient permission.

18 Claims, 9 Drawing Sheets

(56) References Cited

U.S. PATENT DOCUMENTS

| | | | |
|---|---|---|---|
| 2005/0010756 A1 | 1/2005 | Clerc | |
| 2006/0206899 A1 | 9/2006 | Suzuki et al. | |
| 2008/0189793 A1 | 8/2008 | Kirkup et al. | |
| 2009/0327705 A1 | 12/2009 | Ray et al. | |
| 2010/0037061 A1 | 2/2010 | Stefik et al. | |
| 2010/0192204 A1 | 7/2010 | Boulos et al. | |
| 2010/0242097 A1* | 9/2010 | Hotes et al. | 726/4 |
| 2012/0311697 A1* | 12/2012 | Swingler et al. | 726/17 |

OTHER PUBLICATIONS

PCT International Search Report in Application PCT/US2012/066167, mailed May 9, 2013, 10 pages.

Felt et al., "The Effectiveness of Application Permissions", in Proceedings of the 2nd USENIX Conference on Web Application Development, Jun. 15-16, 2011, pp. 75-86, USENIX, Portland, OR, USA.

Chinese 1st Office Action in Application 201210507142.8, mailed Oct. 28, 2014, 11 pgs.

* cited by examiner

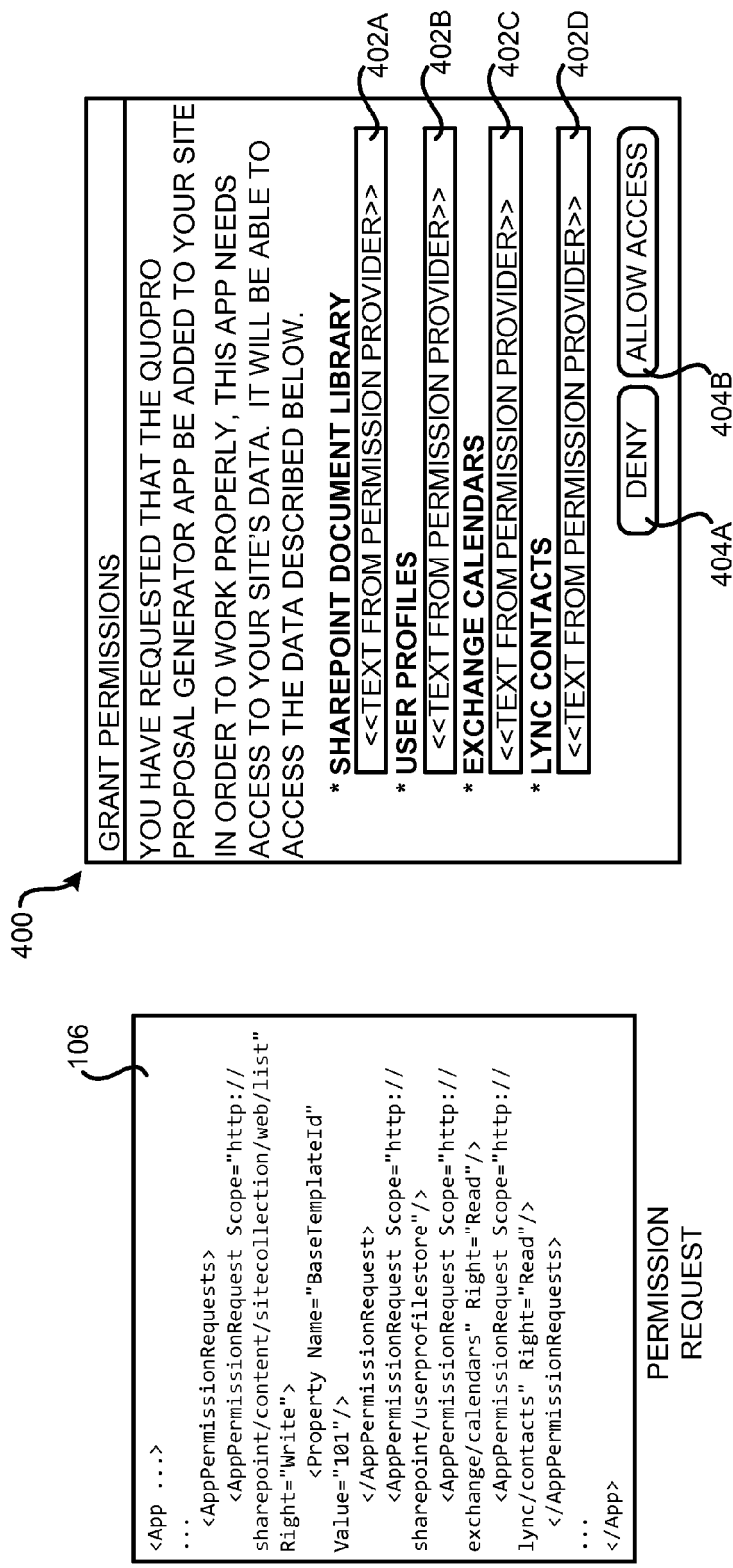

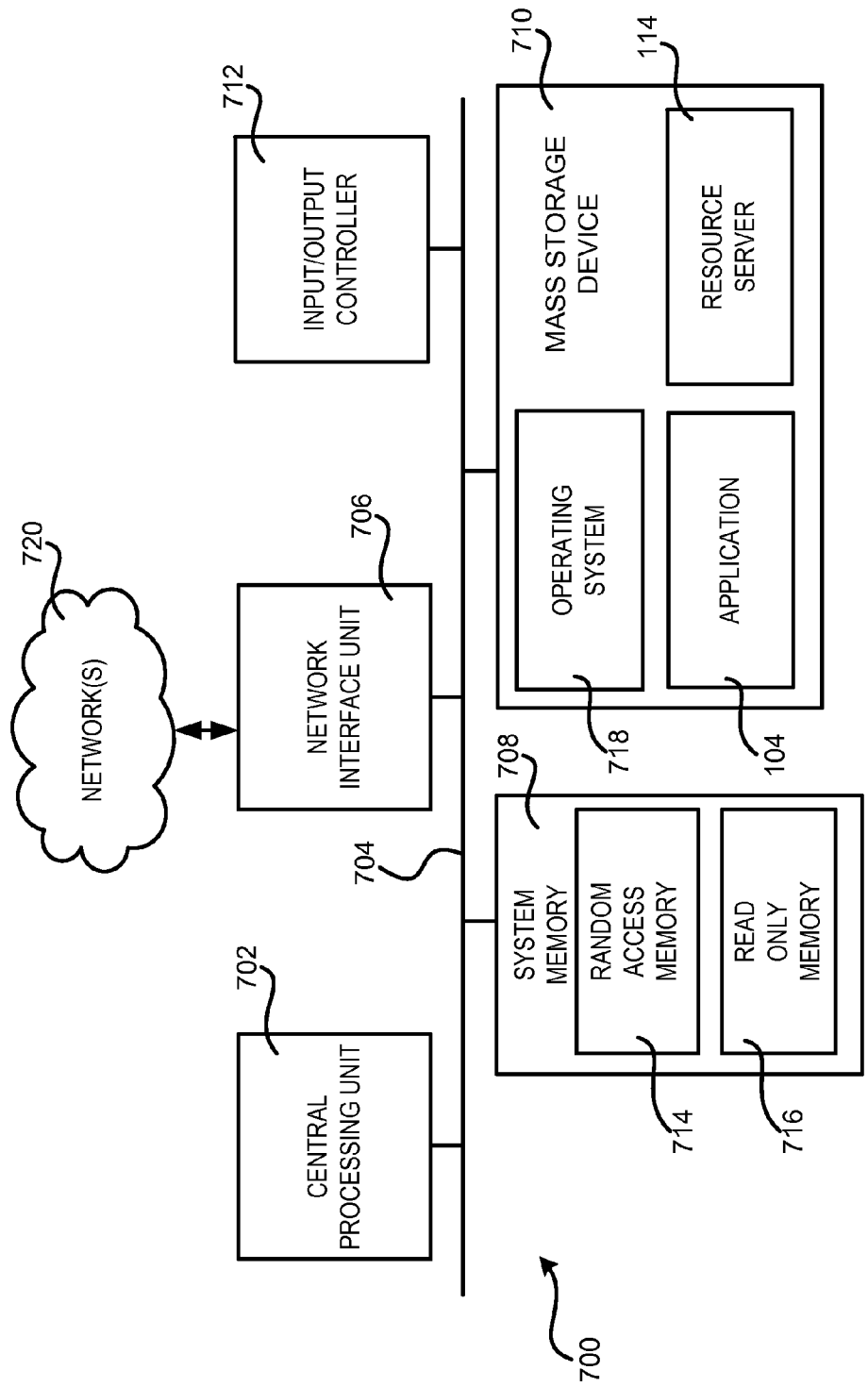

AUTHORIZING APPLICATION ACCESS TO SECURE RESOURCES

BACKGROUND

Many world wide web ("Web") applications allow the installation and use of custom third-party applications that extend the capabilities of the Web application. These third-party applications typically execute, from a permissions perspective, as the current user of the Web application. As a result, such third-party applications can typically perform any action that the current user could perform, typically within some restricted boundaries set for an application executing in conjunction with the Web application. This requires that the system administrator who installs the third-party application place significant trust in the application since the application can read, modify, or delete any information in the Web application that any of the application's user have access to.

One solution to the problem described above is to limit access by third-party applications to only certain functionality provided by a Web application. For instance, a third-party application may only be given access to certain capabilities of a Web application by limiting the application programming interfaces ("APIs") exposed to the application. Another approach to the problem described above is to limit the scope of the trust decision made by the system administrator that installs the application. For example, environments within a Web application may be isolated from one another so that third-party applications can be installed, in separate environments without risk of corrupting other environments. This solution might be utilized, for instance, to limit an application's access to an environment that exposes sensitive data. This solution, however, is severely limiting given the fact that one of the most common reasons to utilize third-party applications is to aggregate data across different environments. Consequently, applications that apply to all of a company's environments across a Web application deployment are difficult or impossible to install in this scenario.

As mentioned above, third-party applications typically execute, from a permissions perspective, as the current user of the Web application. This means that the applications can only perform actions that their users have permission to perform. In many situations, however, it is desirable to allow a user or group of users, through the use of an application, to perform an action that their permissions would not permit them to perform directly. For example, an expense reporting application might approve an expense report when certain conditions are met (e.g., a small value), but a user should not have permission to approve the expense report directly without performing the operation through the application. This type of operation is not possible when the application executes as the current user. Some systems address this limitation by allowing applications to elevate permissions to a system account, which has no permission restrictions within the system. This solution, however, may make system administrators even more unwilling to install applications in environments that expose sensitive information.

It is with respect to these and other considerations that the disclosure made herein is presented.

SUMMARY

Concepts and technologies are described herein for authorizing application access to secure resources. Through an implementation of the technologies disclosed herein, an owner of a secure resource can grant privileges to an application to utilize the secure resource. Utilizing the granted privileges, the application can directly (i.e. without a user) utilize the secure resource at runtime to the same extent as the owner of the resource. If a user utilizes the application to access the secure resource, however, the use of the resource is limited to the extent of the user's privileges. In this way, an application's privileges can be elevated to the level of the owner of a secure resource when the application accesses the secure resource directly. But, access to the secure resource is limited to the extent of a user's permissions when the user utilizes the application to access the resource.

According to one aspect presented herein, a Web application, such as a document repository application, is configured to allow the use of custom third-party applications that extend the capabilities of the Web application. In order to obtain permissions to access and utilize secure resources managed by the Web application, such as items in a content database, an application first submits a permission request to a resource server executing as a part of the Web application. The permission request identifies the scope and rights requested by the application. The permission request might also request that the application be granted permission to utilize one or more secure resources by way of a direct call that is not on behalf of a user. The permission request might be submitted by way of a hypertext transfer protocol ("HTTP") request, an application manifest, user interface ("UI") provided by the Web application, through an API provided by the Web application, or in another manner.

In response to receiving a permission request, the resource server is configured to identify one or more permission providers associated with the secure resources for which permissions are requested. The resource server then requests data from each identified permission provider that describes the permissions requested for an associated secure resource. The data is then aggregated into a UI that is displayed to the current user of the Web application. The UI asks the user to grant or deny the requested permissions to the application. If the user grants the application the requested permissions, data is stored indicating that the application has the requested permissions. At runtime, this data is utilized to process runtime requests by the application for secure resources managed by the Web application.

When a runtime request to perform an action on a secure resource is received by the resource server, the resource server determines whether the request has been made by a user, by an application only, or by an application on behalf of a user. If the request is made by an application only, the resource server grants the request only if the application has been granted permission in the manner described above to access the secure resource by way of a direct call that is not on behalf of a user. If the request is made by an application on behalf of a user, the resource server grants the request only if both the user and the application have permission to perform the requested action. The resource server also stores history data attributing the performance of the action on the secure resource to a user, to the application, or to both the user and the application.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4A is a data structure diagram showing the format and structure of an example permission request utilized in one embodiment disclosed herein;

FIG. 4B is a user interface diagram showing one illustrative user interface for granting permissions to an application in one embodiment disclosed herein;

FIG. 7 is a computer architecture diagram showing an illustrative computer hardware and software architecture for a computing system capable of implementing the various embodiments presented herein.

DETAILED DESCRIPTION

Figure 1:
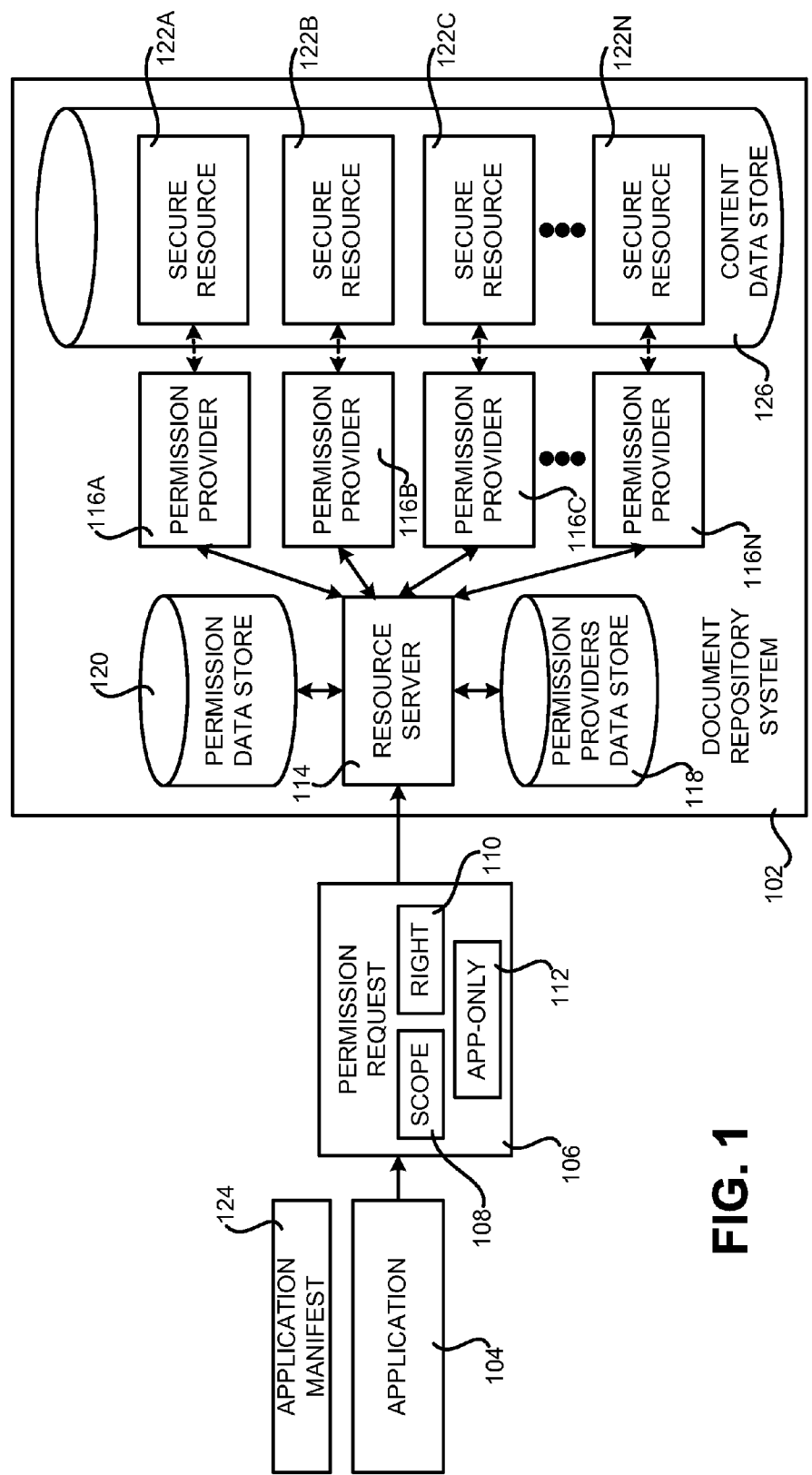
FIG. 1 is software architecture diagram illustrating aspects of the operation of an application and a document repository system in one embodiment disclosed herein.

The following detailed description is directed to concepts and technologies for authorizing application access to secure resources. As discussed briefly above, using the technologies disclosed herein, an application executing in conjunction with a Web application can directly utilize secure resources at runtime to the same extent as the owner of the resources. When a user uses the application to utilize the secure resources, both the user and the application must have appropriate permissions to utilize the secure resources. Additional details regarding these and other features will be provided below with regard to FIGS. 1-7.

While the subject matter described herein is presented in the general context of program modules that execute in conjunction with the execution of an operating system and various programs on one or more computer systems, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for authorizing application access to a secure resource will be described.

FIG. 1 is software architecture diagram illustrating aspects of the operation of an application 104 and a document repository system 102 in one embodiment disclosed herein. The document repository system 102 is one or more computing systems configured to execute a Web-based document repository application (not shown). The document repository system 102 provides functionality for storing, accessing, and sharing documents and potentially other types of items among authorized users of the document repository system 102. In this regard, the document repository system 102 may provide functionality for allowing a user to create, modify, delete, and otherwise utilize documents and other types of electronic items stored in a content data store 126.

The document repository system 102 may restrict access to the items in the content data store 126 based upon permissions. For instance, permissions may be set for the users of the document repository system 102 such that only certain users are permitted to access or modify certain of the items in the content data store 126. Because the items stored in the content data store 126 are secured using permissions in the manner described above, these items are referred to herein as secure resources 122A-122N (collectively, secure resources 122).

It should be appreciated that while the secure resources 122 are primarily described herein as items in a content data store 126, the secure resources 122 might be any other type of computing resource for which access is controlled based upon permissions. It should also be appreciated that while the embodiments disclosed herein are primarily described in the context of a document repository system 102, the embodiments disclosed herein are not limited to such an implementation. Rather, the embodiments disclosed herein can be utilized with any type of computing system that permits an application to access secure resources.

In one embodiment, the document repository system 102 includes a resource server 114 for controlling access to the secure resources 122. The resource server 114 is one or more software and/or hardware components configured to receive and respond to requests to access the secure resources 122. The resource server 114 also provides functionality for registering applications, such as the application 104, to utilize the secure resources 122.

The application 104 is an application that is configured for use with the document repository system 102. For instance, the application 104 might extend the functionality provided by the document repository system 102. The application 104 might be a Web-based application or might execute directly upon the document repository system 102. In order to provide the desired functionality, the application 104 typically utilizes one or more of the secure resources 122. It should be appreciated that while the application 104 is primarily described herein as an application for extending the functionality provided by a document repository system 102, the embodiments utilized herein might be practiced with other types of applications.

In order to gain authorization to utilize the secure resources 122, the application 104 provides a permission request 106 to the resource server 114 in one embodiment. The permission request 106 is data that defines a scope 108 of the access requested by the application 104 and a right 110 that defines the permissions requested for the specified scope. The permission request 106 might also include an "application-only" request 112 that requests that the application 104 be granted permission to utilize one or more of the secure resources 122 by way of direct calls that are not on behalf of a user. The application 104 might submit the permission request 106 by way of a hypertext transfer protocol ("HTTP") request, an application manifest 124, a user interface ("UI") provided by the document repository system 102, through an API provided by the document repository system 102, or in another manner. One example permission request 106 will be described below with regard to FIG. 4A.

In response to receiving a permission request 106 from an application 104, the resource server 114 identifies one or more permission providers 116A-116N (collectively, permission providers 116) that have registered as providers of permissions for the secure resources 122A-122N, respectively. In the example shown in FIG. 1, for instance, the permission provider 116A has registered as a provider of permissions for the secure resources 122A. If the scope 108 in the permission request 106 encompasses the secure resource 122A, the resource server 114 would identify the permission provider 116A as a relevant permission provider for the permission request 106.

In order to register with the resource server 114, each permission provider 116 indicates to the resource server 114 the scope of resources that the permission provider is associated with. Each permission provider 116 might also register callback functions with the resource server 114. For instance, each permission provider 116 might register a callback function with the resource server 114 through which the resource server 114 can obtain data describing the permissions associated with a secure resource 122. As will be described in detail below, the resource server 114 may utilize this data to construct a UI indicating to a user the permissions requested by an application 104 in a permission request 106.

Each permission provider 116 might also register a callback function through which the resource server 114 can provide a notification that a permission request 106 has been granted. The resource server 114 stores the registration data, including data identifying the callback functions, in a permission providers data store 118. Additional details regarding one process for registering the permission providers 116 will be provided below with regard to FIG. 2.

Once the resource server 114 has identified the permission providers 116 relevant to the permission request 106, the resource server 114 calls the callback function of each identified provider 116 for obtaining the data that describes the permissions requested. The resource server 114 might pass the scope 108 and right 110 in the permission request 106 to the identified permission providers 116 along with a current context that identifies the current user. In turn, each called permission provider 116 determines whether the current user has sufficient privileges to grant the application 104 the permissions requested in the permission request 106.

If the user does not have sufficient privileges to grant the application 104 the requested permissions, the permission request 106 will be denied. If the user does have sufficient privileges to grant the permission request 106, each permission provider 116 will return data to the resource server 114 that can be utilized to construct the UI indicating to the user the permissions requested by the application 104. This data may be in the form of hypertext markup language ("HTML"), plain text, or in another format suitable for direct inclusion in a UI element, such as a dialog box.

Once the resource server 114 has received responses from the identified permission providers 116, the resource server 114 aggregates the received data into a UI that is displayed to the current user. The UI sets forth the descriptions of the requested permissions and asks the user to grant or deny the permissions requested by the application 104 in the permission request 106. One such illustrative UI will be described below with regard to FIG. 4B. If the user grants the application 104 the requested permissions through the UI, the resource server 114 stores data in the permission data store 120 indicating that the application 104 has the requested permissions. At runtime, the resource server 114 utilizes this data to process requests by the application 104 to perform actions on the secure resources 122. Additional details regarding the runtime processing performed by the resource server 114 will be provided below with regard to FIGS. 5 and 6A-6B.

Figure 2:
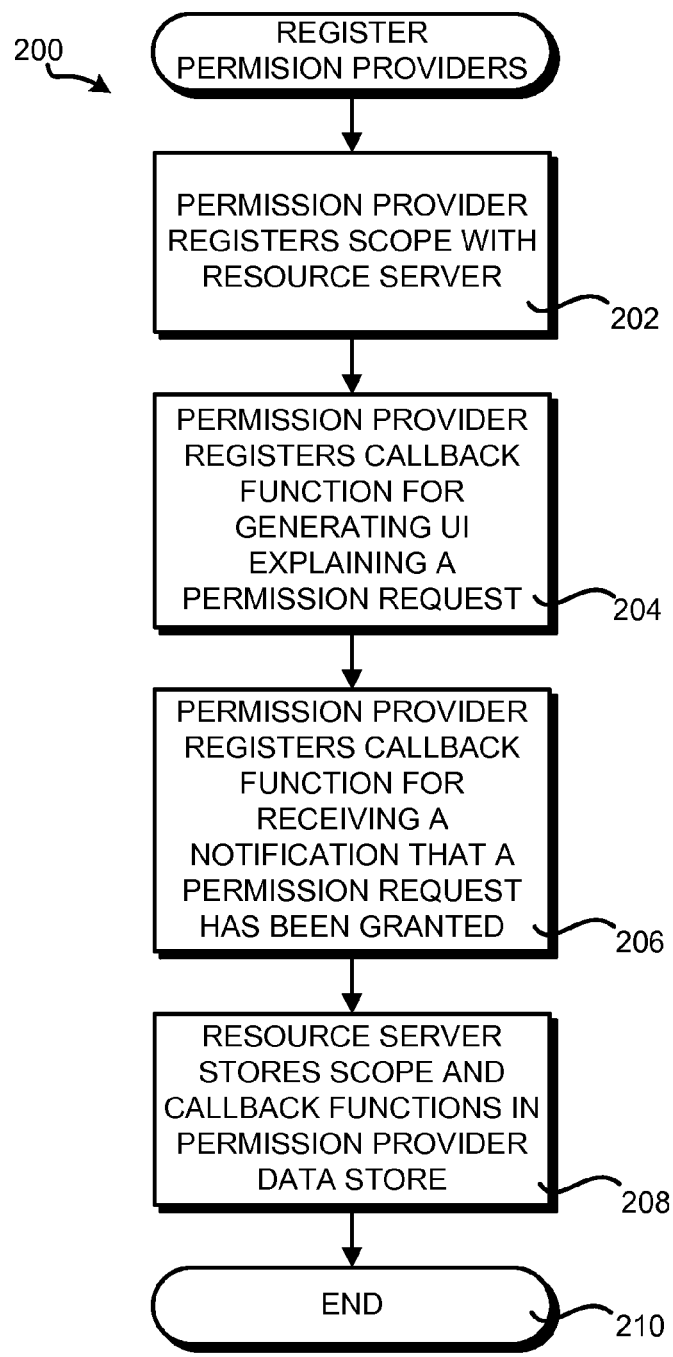
FIG. 2 is a flow diagram showing aspects of one routine for registering permission providers in one embodiment disclosed herein.

FIG. 2 is a flow diagram showing aspects of one routine 200 for registering the permission providers 116 in one embodiment disclosed herein. It should be appreciated that the logical operations described herein with respect to FIG. 2 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the FIGURES and described herein. These operations may also be performed in a different order than those described herein.

The routine 200 begins at operation 202, where a permission provider 116 provides an indication to the resource server 114 of the scope of secure resources for which the permission provider 116 should be registered. The routine 200 then proceeds to operation 204, where the permission provider 116 provides a callback function to the resource server 114 through which the data describing requested permissions can be obtained. As discussed briefly above, the resource server 114 can utilize this information to generate a UI requesting that a user approve or deny a permission request 106.

From operation 204, the routine 200 proceeds to operation 206, where the permission provider 116 provides a callback function to the resource server 114 that the resource server 114 can use to notify the permission provider 116 that a permission request 106 has been granted. It should be appreciated that the information provided at operations 202, 204, and 206 might be provided in one or multiple data structures. This information might also be formatted using the extensible markup language ("XML"), using another structured language format, or in another manner altogether.

From operation 206, the routine 200 proceeds to operation 208, where the resource server 114 stores the scope and callback functions identified by the permission provider 116 in the permission providers data store 118. Once the data has been stored, the routine 200 proceeds from operation 208 to operation 210, where it ends.

Figure 3A:
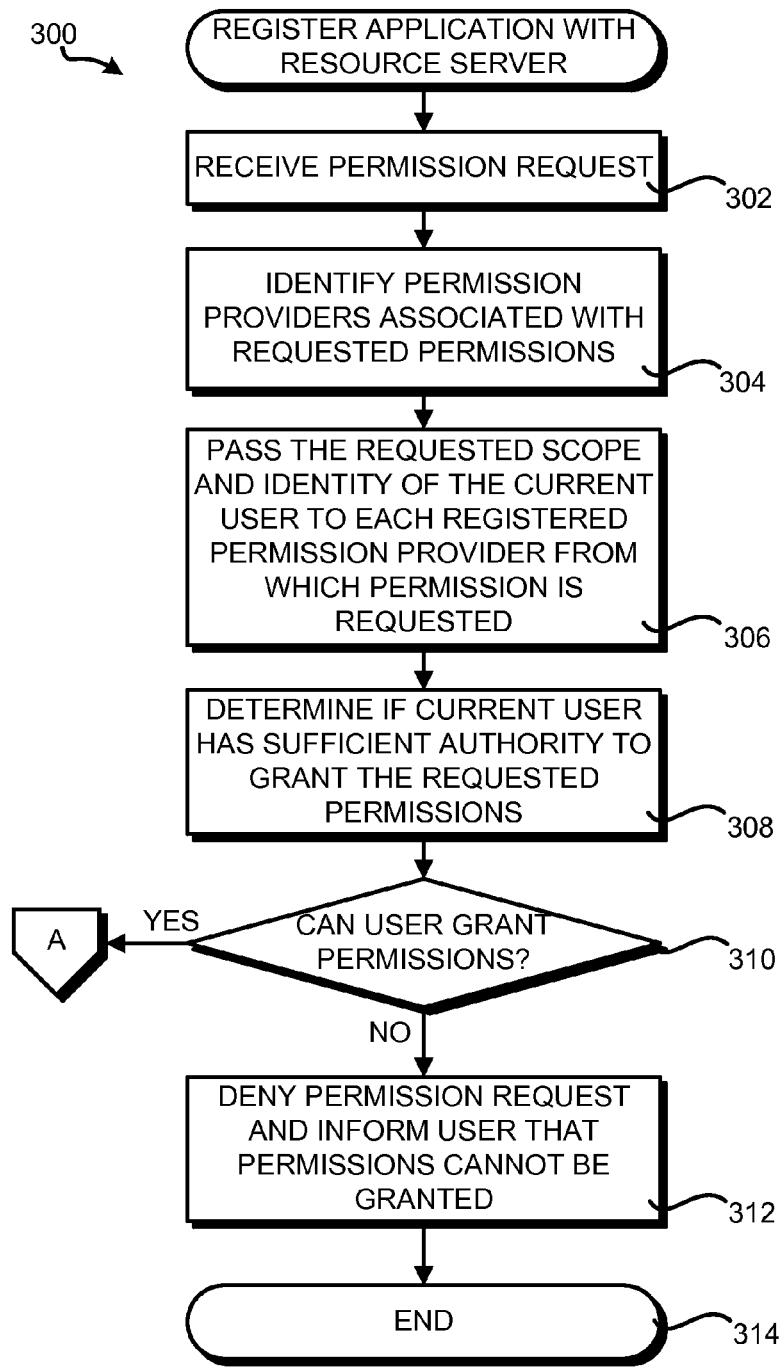
FIGS. 3A-3B are flow diagrams showing aspects of one routine for registering an application with a resource server in one embodiment disclosed herein.
Figure 3B:
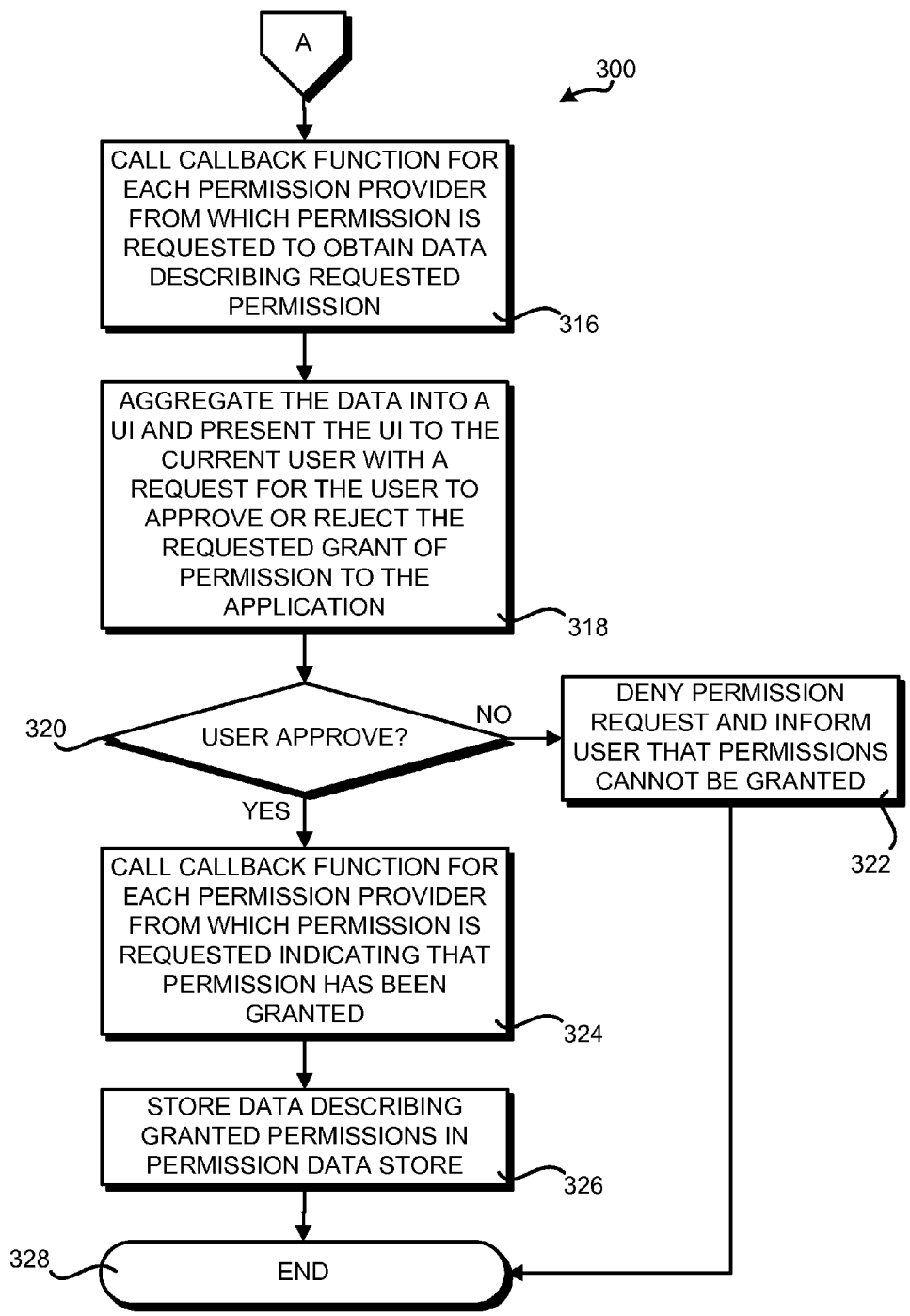

FIGS. 3A-3B are flow diagrams showing aspects of one routine 300 for registering an application 104 with the resource server 114 in one embodiment disclosed herein. The routine 300 begins at operation where the resource server 114 receives the permission request 106. The routine 300 then continues to operation 304, where the resource server 114 identifies the permission providers 116 associated with the scope 108 of permissions set forth in the permission request 106. For instance, the resource server 114 might iterate through the information stored in the permission providers data store 118 in order to identify the permission providers 116 associated with the scope 108. Once the permission providers 116 have been identified, the routine 300 proceeds from operation 304 to operation 306.

At operation 306, the resource server 114 passes the requested scope 108, right 110, application-only request 112, if any, and the current context to each of the registered permission providers 116 from which permission is requested. In response to receiving this information, each permission provider 116 determines if the current user has sufficient authority to grant the requested permissions. This may be accomplished, for instance, by referencing data stored in the permission data store 120 that indicates the privileges held by the current user. If the user cannot grant the requested permissions to the application 104, the routine 300 proceeds from operation 310 to operation 312, where the permission request 106 is denied. Additionally, a UI may be presented to the user indicating that the permissions cannot be granted. The routine 300 then proceeds from operation 312 to operation 314, where it ends.

If the user does possess sufficient privileges to grant the permission request 106, the routine 300 proceeds from operation 310 to operation 316 (shown in FIG. 3B). At operation 316, the resource server 114 calls the callback function of each identified permission provider 116 to obtain data describing the permission requested of each permission provider 116. In turn, each of the called permission providers 116 provides the requested information to the resource server 114. The routine 300 then proceeds from operation 316 to operation 318.

At operation 318, the resource server 114 aggregates the data received from the permission providers 116 into a UI and presents the UI to the current user. As mentioned above, the UI also asks the user to approve or reject the grant of privileges to the application 104 set forth in the permission request 106. One such UI will be described below with regard to FIG. 4B.

If the user rejects the grant of privileges to the application 104, the routine 300 proceeds from operation 320 to operation 322. At operation 322, the permission request 106 is denied. Additionally a UI may be presented to the user indicating that the requested permissions cannot be granted. The routine 300 then proceeds from operation 322 to operation 328, where it ends.

If the user approves the permission request 106, the routine 300 proceeds from operation 320 to operation 324. At operation 324, the resource server calls the callback function exposed by each identified permission provider 116 for indicating that the permission request 106 was granted. The routine 300 then proceeds to operation 326, where data is stored in the permission data store 120 indicating the grant of the requested permissions to the application 104. As mentioned above, this data is utilized at runtime to determine whether requests received from the application 104 for secure resources 122 should be approved or denied. From operation 326, the routine 300 proceeds to operation 328, where it ends.

FIG. 4A is a data structure diagram showing the format and structure of an example permission request 106 utilized in one embodiment disclosed herein. In particular, in the example permission request 106 shown in FIG. 4A, an application 104 is requesting permission to four different secure resources. Accordingly, the permission request 106 includes an XML element corresponding to each resource. In particular, one element corresponds to a request for privileges to a document library, one element corresponds to a request for privileges to a user profile store, one element corresponds to a request for privileges to calendars, and another element corresponds to a request for privileges to contacts.

For each secure resource for which privileges are requested, the permission request 106 also specifies the requested right. For example, the permission request 106 shown in FIG. 4A requests the right to read contact, read calendars, and to write to a document library. It should be appreciated that other types of rights might also be requested. It should be appreciated that while the permission request shown in FIG. 4A has been expressed utilizing XML, other structured or unstructured languages might also be utilized. Other elements, configurations, and arrangements of data might also be utilized to express the scope 108, right 110, application-only request 112, and any other elements of a permission request 106.

FIG. 4B is a user interface diagram showing one illustrative user interface 400 for granting permissions to an application 104 in one embodiment disclosed herein. As discussed above, the resource server 114 generates the user interface 400 following the receipt of the permission request 106. The UI 400 shown in FIG. 4B is generated based upon the permission request 106 shown in FIG. 4A.

The user interface 400 includes text explaining to a user that an application has requested access to the secure resources 122. The user interface 400 also includes text describing the various permissions requested by the application 104 in the permission request 106. As discussed above, this information might be obtained from the permission providers 116 associated with the scope 108 set forth in the permission request 106 by way of a callback function. The information received from the permission providers 116 is displayed in the fields 402A-402D in one embodiment.

In the example shown in FIG. 4B, for instance, the data received from a permission provider 116 for a document library describing a requested permission may be shown in the field 402A. The data received from a permission provider 116 for user profiles may be displayed in the field 402B. The data received from a permission provider 116 for calendars describing the requested permission may be shown in the field 402C. The data received from a permission provider 116 for contacts may be displayed in the field 402B. The current user may select the UI control 404B to grant the requested privileges. Alternatively, the user may select the UI control 404A to deny the permission request 106.

It should be appreciated that the user interface shown in FIG. 4B is merely illustrative and that more or less data might be presented. For example, additional fields 402 might be presented, including fields indicating that an application-only request 112 has been made. Additionally, the presented data might be presented in a different manner or utilizing different UI controls than shown in FIG. 4B. Other variations will be apparent to those skilled in the art.

Figure 5:
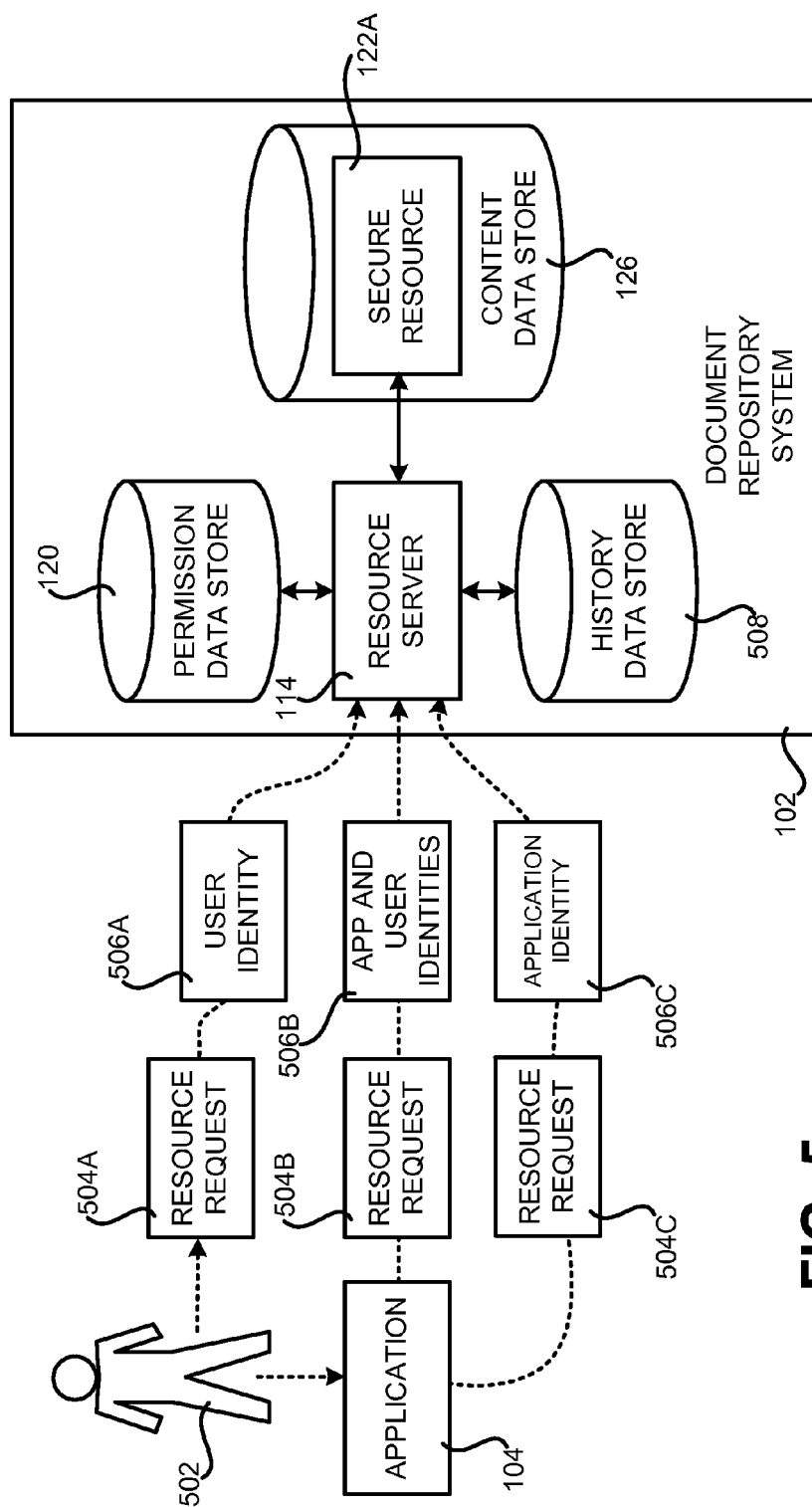
FIG. 5 is a network diagram showing aspects of a mechanism utilized in one embodiment disclosed herein for processing resource requests.

FIG. 5 is a network diagram showing aspects of a mechanism utilized in one embodiment disclosed herein for processing runtime resource requests. In the example shown in FIG. 5, a user 502 and the application 104 may initiate requests for secure resources ("resource requests 504") to the resource server 114. In particular, the user 502 might generate a resource request 504A for the secure resource 122A directly through the document repository system 102, without the use of the application 104. Similarly, the application 104 might generate a resource request 504C for the secure resource 122A directly and not on behalf of the user 502. Additionally, the user 502 might utilize the application 104 to generate the resource request 504B, which is made by the application 104 and the user 502.

In order to determine whether a resource request 504 is made by a user 502 only, by an application 104 only, or by an application 104 on behalf of a user 502, an appropriate authentication mechanism might be utilized. Through such a mechanism, a user identity 506A is presented to the resource server 114 when a resource request 504A is made by a user 502 only. An application identity 506C is presented to the resource server 114 when a resource request 504C is made by an application 104 only. Similarly, application and user identities 50613 are presented to the resource server 114 when a resource request 504B is made by an application 104 on behalf of a user 502. An appropriate protocol may be utilized to present the identities 506 to the resource server 114 when resource requests 504 are made. Other mechanisms might also be utilized to authenticate the user 502 and the application 104 and to indicate to the resource server 114 when a resource request 504 has been made by a user 502 only, by an application 104 only, or by an application 104 on behalf of a user 502.

In response to receiving a resource request 504, the resource server 114 determines whether the resource request 504 was made by a user 502, by an application 104 only, or by an application 104 on behalf of a user 502. The resource server 114 then retrieves data from the permission data store 120 to determine if the resource request 504 can be granted or should be denied. If a resource request 504 is made by an application 104 only, the resource server 114 grants the request 504 only if the application 104 has been granted permission in the manner described above to access the secure resource 122 by way of a direct call that is not on behalf of a user. If the resource request 504 is made by an application 104 on behalf of a user 502, the resource server 114 grants the request 504 only if both the user 502 and the application 104 have permission to perform the requested action. The resource server 114 might also store data in a history data store 508 attributing the performance of the action on the secure resource 122 to the user 502, to the application 104, or to both the user 502 and the application 104, as appropriate. Additional details regarding these processes will be provided below with regard to FIGS. 6A-6B.

Figure 6A:
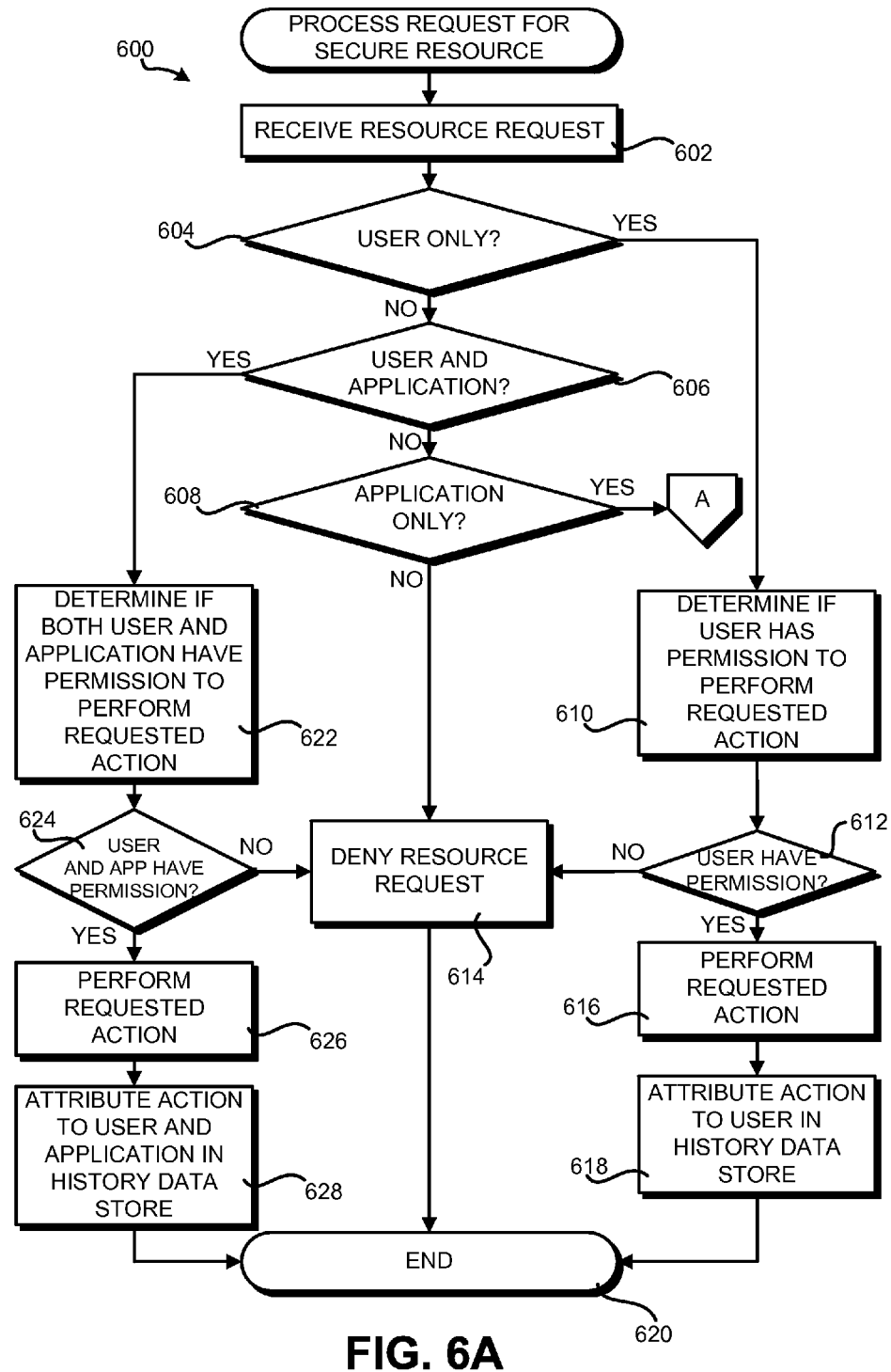
FIGS. 6A-6B are flow diagrams showing aspects of one routine for processing requests for secure resources according to one embodiment.
Figure 6B:
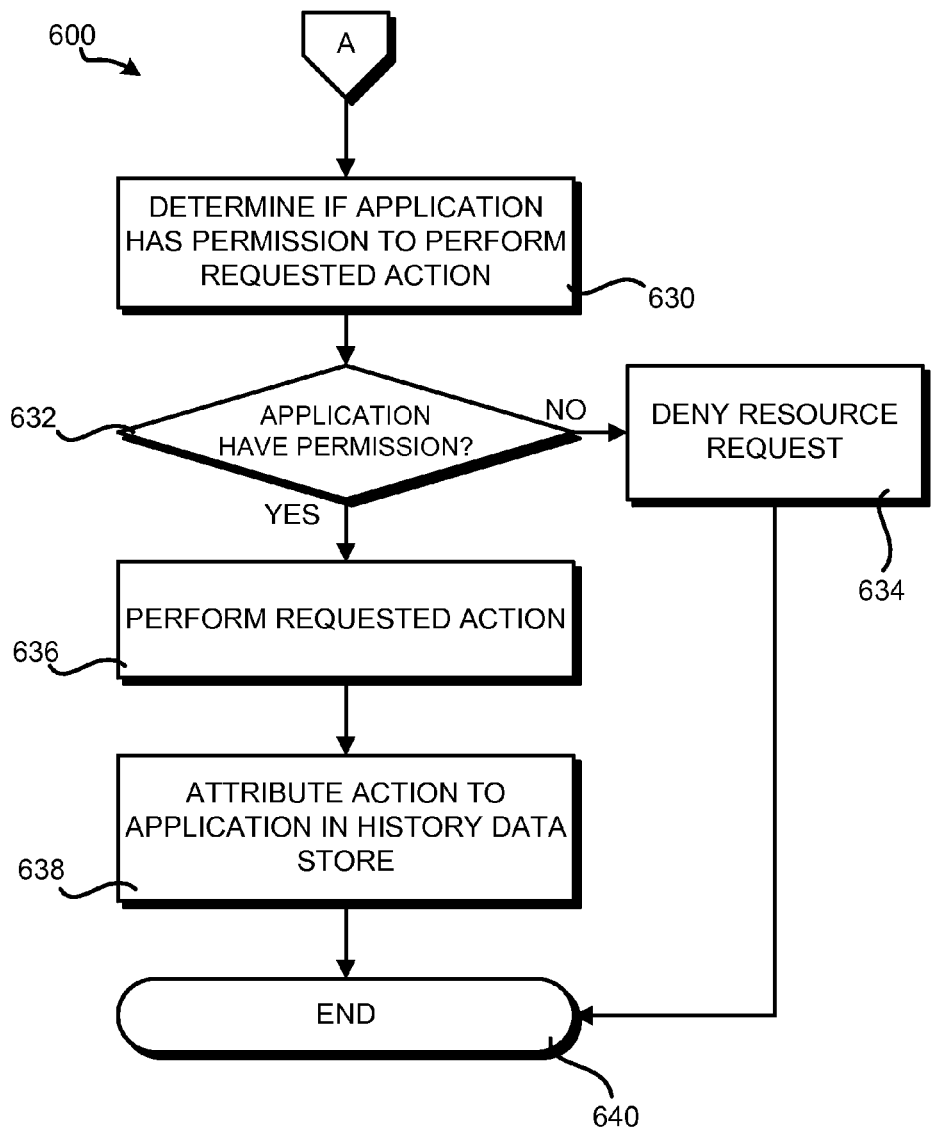

FIGS. 6A-6B are flow diagrams showing aspects of one routine 600 for processing runtime requests 504 for secure resources 122 according to one embodiment. The routine 600 begins at operation 602, where the resource server 114 receives a resource request 504. In response to receiving the resource request 504, the routine 600 proceeds to operation 604, where the resource server 114 determines whether the receive request 504 was made on behalf of only a user 502. If the request 504 was made on behalf of only a user 502, the routine 600 proceeds from operation 604 to operation 610.

At operation 610, the resource server 114 utilizes the permission data store 120 to determine if the user 502 making the request has sufficient privileges to perform the action requested in the received resource request 504. If the user 502 does not have sufficient privileges, the routine 600 proceeds from operation 612 to operation 614, where the received resource request 504 is denied. The routine 600 then proceeds from operation 614 to operation 620, where it ends.

If the user 502 has sufficient privileges, the routine 600 proceeds from operation 612 to operation 616, where the action requested in the received resource request 504 is performed. For instance, a read operation, write operation, or another type of operation might be performed on the secure resource 122. Once the action has completed, the routine 600 proceeds to operation 618, where the resource server 114 stores data in the history data store 508 attributing the performed action to the user 502. For instance, data may be stored indicating that the user 502 performed a write operation on a secure resource 122. From operation 618, the routine 600 proceeds to operation 620, where it ends.

If, at operation 604, the resource server 114 determines that the received resource request 504 was not made by a user 502 only, the routine 600 proceeds to operation 606. At operation 606, the resource server 114 determines whether the received resource request 504 was made by an application 140 on behalf of a user 502. If the received resource request 504 was made by application 140 on behalf of the user 502, the routine 600 proceeds from operation 606 to operation 622.

At operation 622, the resource server 114 utilizes the permission data store 120 to determine if both the application 104 and the user 502 have sufficient privileges to perform the action requested in the received resource request 504. If either the application 104 or the user 502 does not have sufficient privileges, the routine 600 proceeds from operation 624 to operation 614, where the received resource request 504 is denied. The routine 500 then proceeds from operation 614 to operation 620, where it ends.

If both the application 104 and the user 502 have sufficient privileges, the routine 600 proceeds from operation 624 to operation 626, where the action requested in the received resource request 504 is performed. Once the action has been completed, the routine 600 proceeds to operation 628, where the resource server 114 stores data in the history data store 508 attributing the performed action to both the application 104 and the user 502. For instance, data may be stored indicating that the application 104 performed a delete operation on a secure resource 122 on behalf of the user 502. From operation 628, the routine 600 proceeds to operation 620, where it ends.

If, at operation 606, the resource server 114 determines that the received resource request was not made on behalf of both a user 502 and an application 104, the routine 600 proceeds from operation 606 to operation 608. At operation 608, the resource server 114 determines whether the received resource request 504 was made on behalf of only the application 104. If the received resource request 504 was not made on behalf of only an application 104, the routine 600 proceeds from operation 608 to operation 614 where the received resource request 504 is denied. The routine 600 then proceeds from operation 614 to operation 620, where it ends.

If the resource server 114 determines that the received resource request 504 was made on behalf of only an application 104, the routine 600 proceeds from operation 608 to operation 630 (shown in FIG. 6B). At operation 630, the resource server 114 utilizes the permission data store 120 to determine if the application 104 has sufficient privileges to perform the action requested in the received resource request 504. If the application 104 does not have sufficient privileges, the routine 600 proceeds from operation 632 to operation 634, where the received resource request 504 is denied. The routine 600 then proceeds from operation 634 to operation 640, where it ends.

If the application 104 does have sufficient privileges, the routine 600 proceeds from operation 632 to operation 636, where the action requested in the received resource request 504 is performed. Once the action has completed, the routine 600 proceeds to operation 638, where the resource server 114 stores data in the history data store 508 attributing the performed action to only the application 104. From operation 638, the routine 600 proceeds to operation 640, where it ends.

FIG. 7 is a computer architecture diagram showing an illustrative computer hardware and software architecture for a computing system capable of implementing the various embodiments presented herein. The computer architecture shown in FIG. 7 illustrates a conventional desktop, laptop computer, or server computer and may be utilized to execute the various software components described above for providing the functionality disclosed herein.

The computer architecture shown in FIG. 7 includes a central processing unit 702 ("CPU"), a system memory 708, including a random access memory 714 ("RAM") and a read-only memory ("ROM") 716, and a system bus 704 that couples the memory to the CPU 702. A basic input/output system ("BIOS") (not shown) containing the basic routines that help to transfer information between elements within the computer 700, such as during startup, is stored in the ROM 716. The computer 700 further includes a mass storage device 710 for storing an operating system 718, application programs, and other program modules, which will be described in greater detail below.

The mass storage device 710 is connected to the CPU 702 through a mass storage controller (not shown) connected to the bus 704. The mass storage device 710 and its associated computer-readable storage media provide non-volatile storage for the computer 700. Although the description of computer-readable media contained herein refers to a mass storage device, such as a hard disk or CD-ROM drive, it should be appreciated by those skilled in the art that computer-readable storage media can be any available computer storage media that can be accessed by the computer 700.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 700.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media. Computer-readable storage media does not encompass communication media.

According to various embodiments, the computer 700 may operate in a networked environment using logical connections to remote computers through a network such as the network 720. The computer 700 may connect to the network 720 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer 700, including an operating system 704 suitable for controlling the operation of a networked desktop, laptop, or server computer. The mass storage device 710 and RAM 714 may also store one or more program modules. In particular, the mass storage device 710 and the RAM 714 may store one or more software components for providing the functionality described above, such as the application 104 or the resource server 114, or another type of program or service. The mass storage device 710 and RAM 714 may also store the other program modules and data disclosed herein.

In general, software applications or modules may, when loaded into the CPU 702 and executed, transform the CPU 702 and the overall computer 700 from a general-purpose computing system into a special-purpose computing system customized to perform the functionality presented herein. The CPU 702 may be constricted from any number of transistors or other discrete circuit elements, which may individually or collectively assume any number of states. More specifically, the CPU 702 may operate as one or more finite-state machines, in response to executable instructions contained within the software or modules. These computer-executable instructions may transform the CPU 702 by specifying how the CPU 702 transitions between states, thereby physically transforming the transistors or other discrete hardware elements constituting the CPU 702.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for authorizing application access to a secure resource have been disclosed herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for authorizing access to a secure resource in a document repository system, the method comprising performing computer-implemented operations for:
   receiving a request to perform an action on a secure resource in a document repository system;
   in response to receiving the request, determining whether the request has been made by a user only, by an application only, or by an application on behalf of a user;
   in response to determining that the request has been made by an application on behalf of the user, granting the request if the application and the user both have permission to access the secure resource, wherein, if the application has a different access privilege level than the user, the request is granted to an extent permitted by an access privilege level granted to the user; and
   in response to determining that the request has been made by the application only, granting the request if the application has been granted permission to access the secure resource by way of a direct call that is not on behalf of the user.

2. The computer-implemented method of claim 1, further comprising: storing data attributing performance of the requested action to only the application in response to determining that the request has been made by the application only.

3. The computer-implemented method of claim 1, further comprising: storing data attributing performance of the requested action to both the application and the user in response to determining that the request has been made by an application on behalf of the user.

4. The computer-implemented method of claim 1, wherein the secure resource comprises an item in a content database maintained by the document repository system.

5. A computer-readable storage device having computer-executable instructions stored thereupon which, when executed by a computer, cause the computer to:
   receive a permission request from an application requesting permission to access one or more secure resources maintained by a document repository system on behalf of a user, wherein the permission request is made by one of the user only, by an application only, or by an application on behalf of the user;
   in response to receiving the permission request, identify one or more permission providers associated with the one or more secure resources, request data from each identified permission provider that describes the permissions requested for an associated secure resource, aggregate the data received from the permission providers into a user interface, determine whether a current document repository system user has sufficient permissions to grant the application permission to access the one or more secure resources, and cause the user interface to be displayed to the current document repository system user;
   receive an indication from the current document repository system user by way of the user interface indicating that the application is granted the requested permission to access the one or more secure resources on behalf of the user if the application and the user both have permission to access the secure resource, and receive an indication that the application is granted the requested permission if the permission request is made by the application only and the application has been granted permission to access the secure resource by way of a direct call; and
   in response to receiving the indication that the application is granted the requested permission, store data indicating that the application has the requested permission to access the one or more secure resources for use in processing runtime requests by the application for the secure resources, wherein, if the application has a different access privilege level than the user, the request is granted to an extent permitted by an access privilege level granted to the user.

6. The computer-readable storage device of claim 5, having further computer-executable instructions stored thereupon which, when executed by the computer, cause the computer to:
   deny the permission request in response to determining that a current user does not have sufficient permissions to grant the application permission to access the one or more secure resources.

7. The computer-readable storage device of claim 5, wherein the permissions request further comprises a request by the application to utilize the one or more secure resources by way of a direct call that is not on behalf of a user.

8. The computer-readable storage device of claim 7, having further computer-executable instructions stored thereupon which, when executed by the computer, cause the computer to:
   receive an indication from the current user by way of the user interface indicating that the application is granted permission to utilize the one or more secure resources by way of a direct call; and
   store data for use in processing runtime requests from the application for the secure resources indicating that the application has permission to use the resources by way of a direct call that is not on behalf of the user.

9. The computer-readable storage device of claim 5, wherein the permission request is provided to the document repository system by way of a hypertext transfer protocol (HTTP) request.

10. The computer-readable storage device of claim 5, wherein the permission request is provided to the document repository system by way of an application manifest.

11. The computer-readable storage device of claim 5, wherein the permission request is provided to the document repository system by way of a user interface provided by the document repository system.

12. The computer-readable storage device of claim 5, wherein the permission request is provided to the document repository system by way of an application programming interface (API) exposed by the document repository system.

13. The computer-readable storage device of claim 5, having further computer-executable instructions stored thereupon which, when executed by the computer, cause the computer to:
   register each of the permission providers as being associated with a scope of secure resources prior to receiving the permission request from the application.

14. The computer-readable storage device of claim 13, wherein registering each of the permission providers further comprises registering a callback function for each of the permission providers for obtaining data describing the permissions associated with a resource, and wherein requesting data from each identified permission provider that describes the permissions requested comprises making a call to the callback function of each identified permission provider.

15. The computer-readable storage device of claim 13, wherein registering each of the permission providers further comprises registering a callback function for each of the permission providers for providing a notification that a permission request has been granted.

16. The computer-readable storage device of claim 15, having further computer-executable instructions stored thereupon which, when executed by the computer, cause the computer to:

call the callback function for providing a notification that a permission request has been granted in response to receiving an indication from a current user by way of the user interface indicating that the application is granted the requested permission.

17. A document repository system comprising:
one or more computer systems configured to:
receive a permission request from an application requesting permission to access one or more secure resources maintained by a document repository system on behalf of a user;
in response to receiving the permission request, causing a user interface to be displayed to a user of the document repository system requesting that the user grant or deny the permission request;
receive an indication from the user by way of the user interface indicating that the application is granted the requested permission to access the one or more secure resources;
in response to receiving the indication that the application is granted the requested permission, store, via a storage device, data indicating that the application has the requested permission to access the one or more secure resources for use in processing runtime requests by the application for the secure resources;
receive a runtime request to perform an action on a secure resource in the document repository system;
determine in response to receiving the request whether the request has been made by a user, by an application, or by an application on behalf of a user;
in response to determining that the request has been made by an application on behalf of the user, grant the request if the application and the user both have permission to access the secure resource, wherein, if the application has a different access privilege level than the user, the request is granted to an extent permitted by an access privilege level granted to the user; and
in response to determining that the request has been made by the application only, grant the request if the application has been granted permission to access the secure resource by way of a direct call that is not on behalf of the user.

18. The document repository system of claim 17, wherein the one or more computer systems are further configured to:
store data attributing performance of the requested action to only the application in response to determining that the request has been made by an application only, and to store data attributing performance of the requested action to both the application and the user in response to determining that the request has been made by an application on behalf of the user.

* * * * *